US009621524B2

(12) United States Patent
Brenner (10) Patent No.: US 9,621,524 B2
(45) Date of Patent: Apr. 11, 2017

(54) CLOUD-BASED KEY MANAGEMENT

(71) Applicant: Sophos Limited, Abingdon Oxfordshire (GB)

(72) Inventor: Stephan Brenner, Munich (DE)

(73) Assignee: Sophos Limited, Abingdon (GB)

( * ) Notice: Subject to any disclaimer, the term of this patent is extended or adjusted under 35 U.S.C. 154(b) by 116 days.

(21) Appl. No.: 14/107,752

(22) Filed: Dec. 16, 2013

(65) Prior Publication Data

US 2015/0172260 A1    Jun. 18, 2015

(51) Int. Cl.
*H04L 29/06* (2006.01)

(52) U.S. Cl.
CPC .......... *H04L 63/061* (2013.01); *H04L 63/083* (2013.01)

(58) Field of Classification Search
CPC .................................... H04L 9/0822
USPC .......................... 713/171; 380/281
See application file for complete search history.

(56) References Cited

U.S. PATENT DOCUMENTS

| 6,694,025 | B1 * | 2/2004 | Epstein | H04L 9/0894 380/277 |
| 2001/0014158 | A1 * | 8/2001 | Baltzley | G06F 21/00 380/281 |
| 2005/0160098 | A1 * | 7/2005 | Campbell | G06Q 30/04 |
| 2009/0276623 | A1 * | 11/2009 | Jevans | G06F 21/6209 713/155 |
| 2012/0036364 | A1 * | 2/2012 | Yoneda | H04L 9/30 713/175 |

OTHER PUBLICATIONS

Microsoft. "How Private Keys Are Stored." Aug. 27, 2012 . <http://web.archive.org/web/20120827032149/http://technet. microsoft.com/en-us/library/cc962112.aspx>.*

* cited by examiner

*Primary Examiner* — Mahfuzur Rahman
*Assistant Examiner* — Michael Guirguis
(74) *Attorney, Agent, or Firm* — Strategic Patents, P.C.

(57) ABSTRACT

Cloud storage of sensitive data is improved by ensuring that all cloud-based data is encrypted at all times, not only when the data is at rest (i.e., stored), but also while data is being processed or communicated. Cryptographic keys can advantageously be managed via cloud based resources without exposing sensitive data. Instead, a key management system maintains cryptographic functions on administrative hosts and endpoints outside of cloud-based resources so that any vulnerabilities of the cloud-based resources will expose only encrypted data, and keys and sensitive data will never be exposed in unencrypted form. Thus sensitive data is protected end-to-end among hosts and endpoints using, e.g., platform independent cryptographic functions and libraries within a web browser or the like, and the cloud functions simply as a storing and forwarding medium for secure data.

30 Claims, 9 Drawing Sheets

CLOUD-BASED KEY MANAGEMENT

BACKGROUND

Cloud computing services are becoming widely used to reduce information technology administration burdens and increase user flexibility. However, by using a cloud computing service, users place their data on the Internet where malicious users may attempt to gain access. A variety of techniques exist for securing communications to and from such cloud-based resources, and for encrypting user data for storage in the cloud. However, the existing solutions generally present vulnerabilities in which encryption keys or underlying data are periodically or permanently exposed in plaintext form by remote resources where any physical vulnerabilities might result in the exposure of sensitive data. These problems are multiplied where a cloud-based resource is integral to a distributed key management system.

There remains a need for key management techniques that ensure only encrypted data is present in cloud-based resources where administrators and end users have little or no control over physical and network security.

SUMMARY

Cloud storage of sensitive data is improved by ensuring that all cloud-based data is encrypted at all times, not only when the data is at rest (i.e., stored), but also while data is being processed or communicated. Cryptographic keys can advantageously be managed via cloud based resources without exposing sensitive data. Instead, a key management system maintains cryptographic functions on administrative hosts and endpoints outside of cloud-based resources so that any vulnerabilities of the cloud-based resources will expose only encrypted data, and keys and sensitive data will never be exposed in unencrypted form. Thus sensitive data is protected end-to-end among hosts and endpoints using, e.g., platform independent cryptographic functions and libraries within a web browser or the like, and the cloud functions simply as a storing and forwarding medium for secure data.

In one aspect, a method disclosed herein includes providing an administrator password for a host of an enterprise network; storing the administrator password on a remote computing resource; retrieving a company private key for the enterprise network; selecting an endpoint within the enterprise network; creating a rollout password for the endpoint; and creating an endpoint key pair for the endpoint, where the endpoint key pair includes a public endpoint key signed with the company private key and a private endpoint key encrypted with the rollout password. The method may further include transmitting the endpoint key pair to a remote computing resource with a call authenticated using a cryptographic hash of the administrator password, and transmitting a cryptographic hash of the rollout password to the remote computing resource with a second call using a cryptographic hash of the administrator password.

In another aspect, a method disclosed herein includes providing an administrator password for a host of an enterprise network; creating a company key pair for the enterprise network including a company private key and a company public key; securing the company key pair by signing the company public key and encrypting the company private key with the administrator password to provide a secured company key pair; transmitting the secured company key pair from the host to a remote computing resource; providing a rollout password for an endpoint of the enterprise network to the host; creating an endpoint key pair for the endpoint at the host including an endpoint private key and an endpoint public key; securing the endpoint key pair by signing the endpoint public key with the company private key and encrypting the endpoint private key with the rollout password to provide a secured endpoint key pair; and transmitting the secured endpoint key pair from the host to the remote computing resource.

These and other systems, methods, objects, features, and advantages of the embodiments of the present invention will be apparent to those skilled in the art from the following detailed description of the embodiments and the drawings. While the invention has been described in connection with certain preferred embodiments, other embodiments would be understood by one of ordinary skill in the art and are encompassed herein. All documents mentioned herein are hereby incorporated by reference in their entirety.

BRIEF DESCRIPTION OF THE FIGURES

The invention and the following detailed description of certain embodiments thereof may be understood by reference to the following figures, wherein similar reference characters denote similar elements throughout the several views.

DETAILED DESCRIPTION

Various key management systems and methods will now be described more fully hereinafter with reference to the accompanying figures. The illustrated embodiments are provided as examples so that this disclosure will convey the scope of the invention to those skilled in the art, and should not be understood to limit the scope of the inventive concept. In the following description, like reference characters designate like or corresponding parts throughout the figures.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

A classic trust model for central management includes business logic and a database operating in a trusted domain such as a physically protected server machine within an enterprise's network boundaries where only authorized staff has access. However, this model presents numerous vulnerabilities when used with cloud-based storage or services. The techniques described below employ a combination of cryptographic techniques to ensure that all data stored in the cloud is secured either through encryption, verifiable signatures (e.g., for public keys), or some combination of these. In particular, cryptographic functions are performed exclusively on host and endpoint machines outside the cloud and may be supported with cryptographic libraries within a web browser or similar platform. By properly orchestrating such cryptographic functions, secure key distribution and data exchanges can be supported through intermediate cloud services without exposing sensitive information on the cloud and without requiring direct communications between a host and various endpoints.

This approach provides significant advantages over existing key management techniques and security systems. In one aspect, the following techniques ensure that no secure data related to key management is ever present in the cloud in unsecure (e.g., plaintext) form except for public keys, which may be signed for validation as needed. In another aspect, no direct communications between administration hosts and endpoints is required. All communications may be conducted through cloud resources, which can reduce firewall and proxy issues that might otherwise interfere with direct connections. Further, the system may be conveniently implemented using cryptographic libraries realized within a web browser or the like using, e.g., JavaScript or other generally available and machine-independent code for easy portability and cross-platform deployment. None of the prior art offers this combination of advantages.

Figure 1:
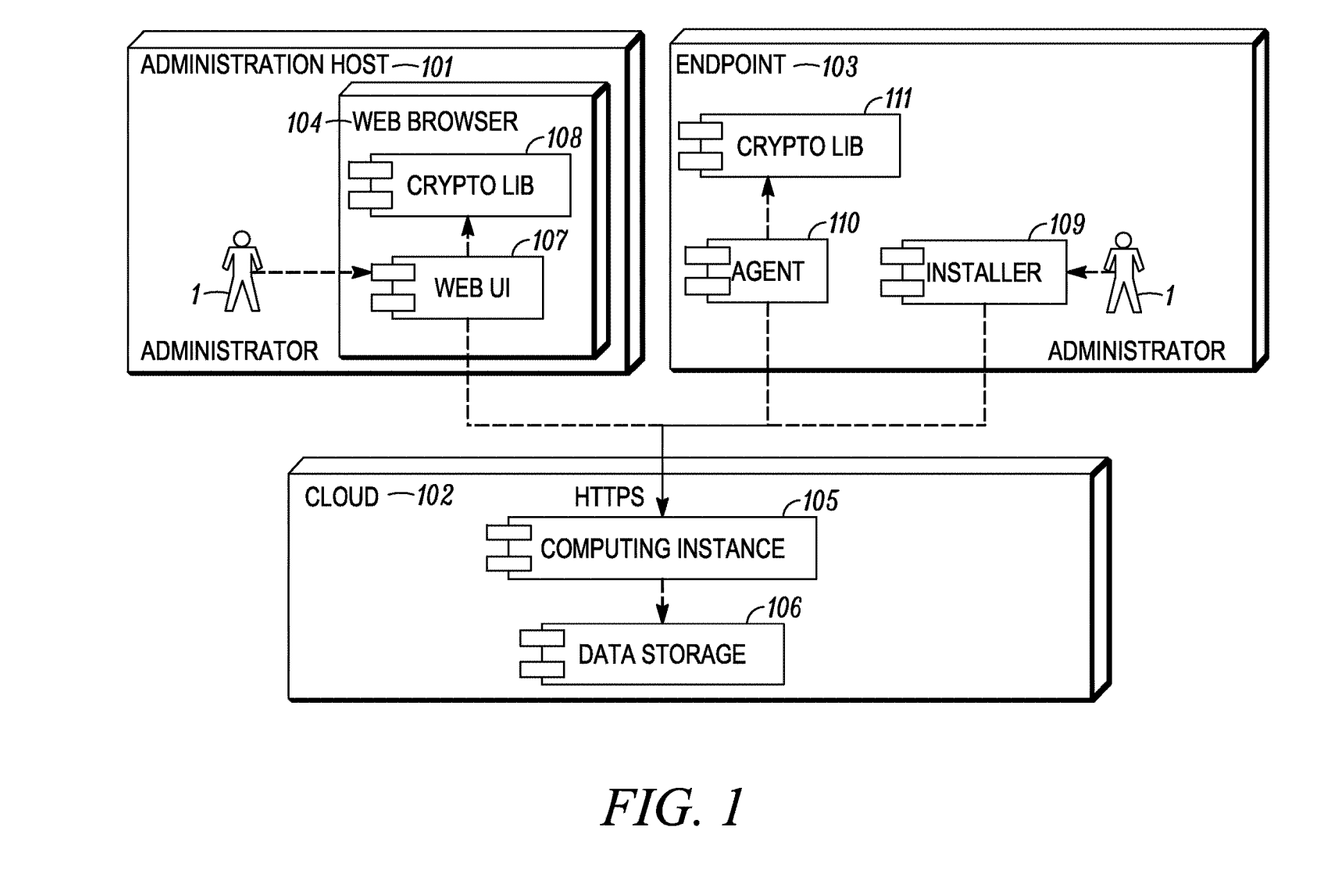
FIG. 1 is a block diagram showing a cloud-based encryption management system.

FIG. 1 shows a block diagram illustrating components of a cloud-based encryption management system. Generally, a cloud-based encryption management solution may include at least three actors: an administration host 101 (e.g., a web browser 104 on a laptop or the like), the cloud 102 (e.g., computing instances 105 and data stores 106 hosted off-premise or the like), and the endpoints 103 (e.g., end user devices and other devices to be managed or the like). The system may provide central management of users, keys, policies, and endpoints from the administration host 101 while using various storage and processing resources in the cloud 102.

The administration host 101 may include a web browser 104, which may include a cryptography library 108 and a web user interface (UI) 107 (e.g., HTML and JavaScript or the like). An administrator 1 may use the web UI 107 to administer a key management system and perform administrative functions such as creating and distributing keys, establishing security policies, creating key hierarchies and rules, and so forth.

The cloud 102 may include any remote computing resources, and may support remote data storage, remotely hosted applications, or any other cloud-based services. By maintaining cryptographic functions on the administration host 101 and one or more endpoints 103 in a manner independent of the cloud 102, no confidential data resides in the cloud 102 in plaintext—not even in the random-access memory (RAM) of computing instances 105 for a fraction of a second. All cryptographic operations may be isolated from the cloud 102 and instead may be performed by a web browser or the like executing on the administration host 101 and an endpoint 103.

The cloud 102 may be hosted by any provider. The cloud 102 may store various secure cryptographic items such as a cryptographic hash of the administrator password, company key pair data (e.g., a private key encrypted with the administrator password or the like), endpoint key pair data (e.g., private keys encrypted with rollout passwords and a public key signed with the company private key or the like), policy extensible markup language (XML) (which may be signed with the company private key), local keys generated on the endpoints (which may be encrypted with the public endpoint key), and status data from the endpoints (which may be signed with the private endpoint key). It will be noted that the cloud 102 will generally not store any key data in plaintext, consistent with the goal of cryptographically securing all sensitive data in the cloud 102.

The endpoint 103 may include an installer 109, to which the administrator 1 may have access. Further, the endpoint 103 may include an agent 110 (which may be installed by the administrator 1) and an endpoint cryptography library 111. The endpoint 103 may also include a web browser for use by an end user, with supporting cryptographic functions implemented using cryptographic libraries in the web browser. The endpoint 103 may communicate with the cloud 102 using any suitable communication interface, which may include Secure Socket Layer (SSL) encryption, Hypertext Transfer Protocol Secure (HTTPS) and so forth for additional security.

The administrator 1 may interact with the user interface 107 on the web browser 104 performing crypto-dependent business logic operations using the administration host cryptography library 108. The encrypted data to be stored on the cloud 102 is then sent to the cloud 102 through using any suitable communication interface, which may include Secure Socket Layer (SSL) encryption, Hypertext Transfer Protocol Secure (HTTPS) and so forth. A computing instance 105 within the cloud 102 may store data in cloud data storage 106 where the data remains encrypted. An endpoint 103 may access the cloud, and the agent 110 executing on the endpoint 103 may synchronize with the cloud 102 to retrieve and send data and so forth using the endpoint cryptography library 111 for cryptographic functions. The endpoint cryptography library 111 may include a cryptographic library installed by the administrator 1 through the installer 109, or may include a cryptographic library resident in a browser or the like on the endpoint 103. At the time of installation, the installer 109 may pass a rollout password hash through to the cloud for verification before use of the agent 110 as contemplated below.

A variety of key management and other secure processes may be realized using the system described above including without limitation, administrator registration, establishing trust to endpoints, key distribution to endpoints, policy deployment, endpoint status reporting, and local key backup. Without limiting the generality of the inventive concepts disclosed herein, a number of specific techniques are now described in greater detail.

Figure 2:
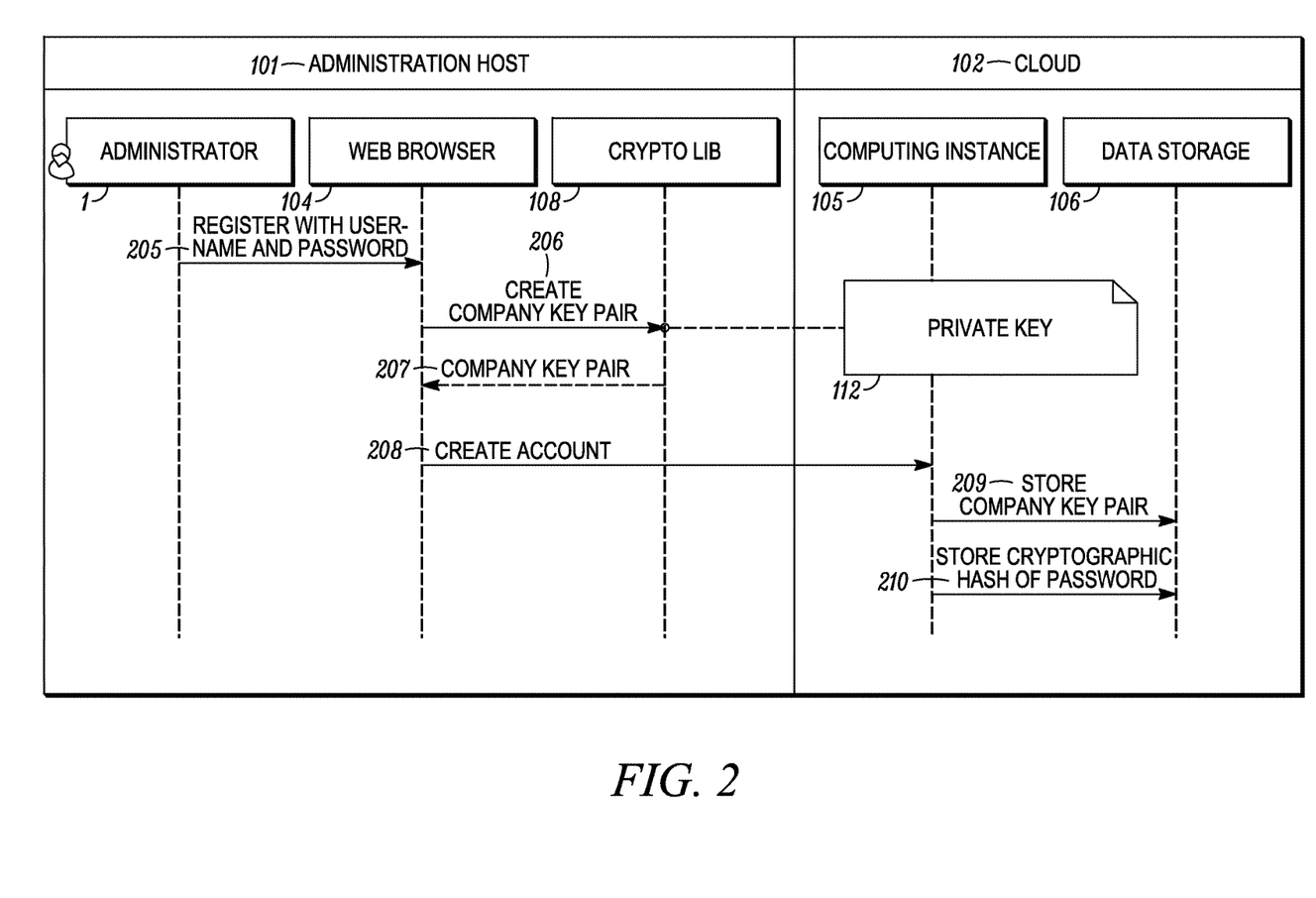
FIG. 2 is a sequence diagram showing a method for administrator registration.

FIG. 2 is a sequence diagram showing a method for administrator registration. In general, a registration process may be performed when the administrator 1 starts the management console in a web browser 104 so that the system can create a user account for the administrator 1. A detailed example of a registration process is provided below.

As shown in step 205, a registration process may begin with an administrator providing a username and a password (or any other suitable credentials) to a web browser or other console on an administration host 101. This information may in turn be presented to the cryptographic library for creation of a corresponding company key pair as shown in step 206. A variety of suitable key pairs and related encryption techniques are known in the art including without limitation a Rivest-Shamir-Adelman (RSA) key pair, a Diffie-Hellman (DH) key pair, elliptic curve cryptography (ECC) key pair, and so forth, any of which may be adapted for use with the methods and systems described herein. In general, the company key pair will include a company private key used, e.g., by the administrator to encrypt or sign data, that is kept private during cryptographic operations. The company key pair also includes a company public key that can be freely shared with others, and according to known cryptographic practices, may be used to decrypt data encrypted with the company private key, verify signatures created with the company private key, and so forth. It will be understood that while asymmetric keys are generally described herein, other techniques using symmetric key pairs may also or instead be adapted for use with the key management systems contemplated herein.

As shown in step 207, a suitably generated key pair may be returned to the web browser 104 and stored in the cloud 102. A cryptographic hash of the password may also be provided. The hash may be required, for example, when the administrator 1 logs on at a later time so that the administrator 1 can be authenticated by the computing instance 105 in the cloud 102. In this manner, the administrator 1 may use any computer with suitable cryptographic libraries to log in and perform key management operations in the key management system, and a dedicated host computer is not generally required. The company private key 112 may be used to sign policies and to decrypt data sent from endpoints 103, and for other similar cryptographic functions. The company private key may be integrity protected and encrypted with the administrator password for storage as a private key 112 on the cloud 102.

In general, the company key pair may be created on the host as illustrated, or the company key pair may be created using a remote key management or key creation resource according to security requirements or policies applicable to a particular key infrastructure. The company private key may be integrity protected and encrypted using the administrator password and the company public key may be signed with the company private key.

An administrator registration process may include creating an account on the cloud 102 through the computing instance 105 (e.g., with the cryptographic hash of the password and the company key pair) using the web browser 104, as illustrated by step 208. The computing instance 105 may then store the company key pair (with the company private key encrypted using, e.g., the administrator password, as discussed above) in data storage 106, as illustrated by step 209, and may store the cryptographic hash of the password in data storage, as illustrated by step 210.

After this registration step, the administrator credentials are stored in the cloud 102 in a manner that can be recovered by the administrator using a suitable password, and in a manner that permits verification of the public company key (which is signed), as well as use of the public company key to encrypt other data. At the same time, the company private key is maintained in a secure form on the cloud 102, and never appears in the cloud 102 in an unencrypted form.

Figure 3:
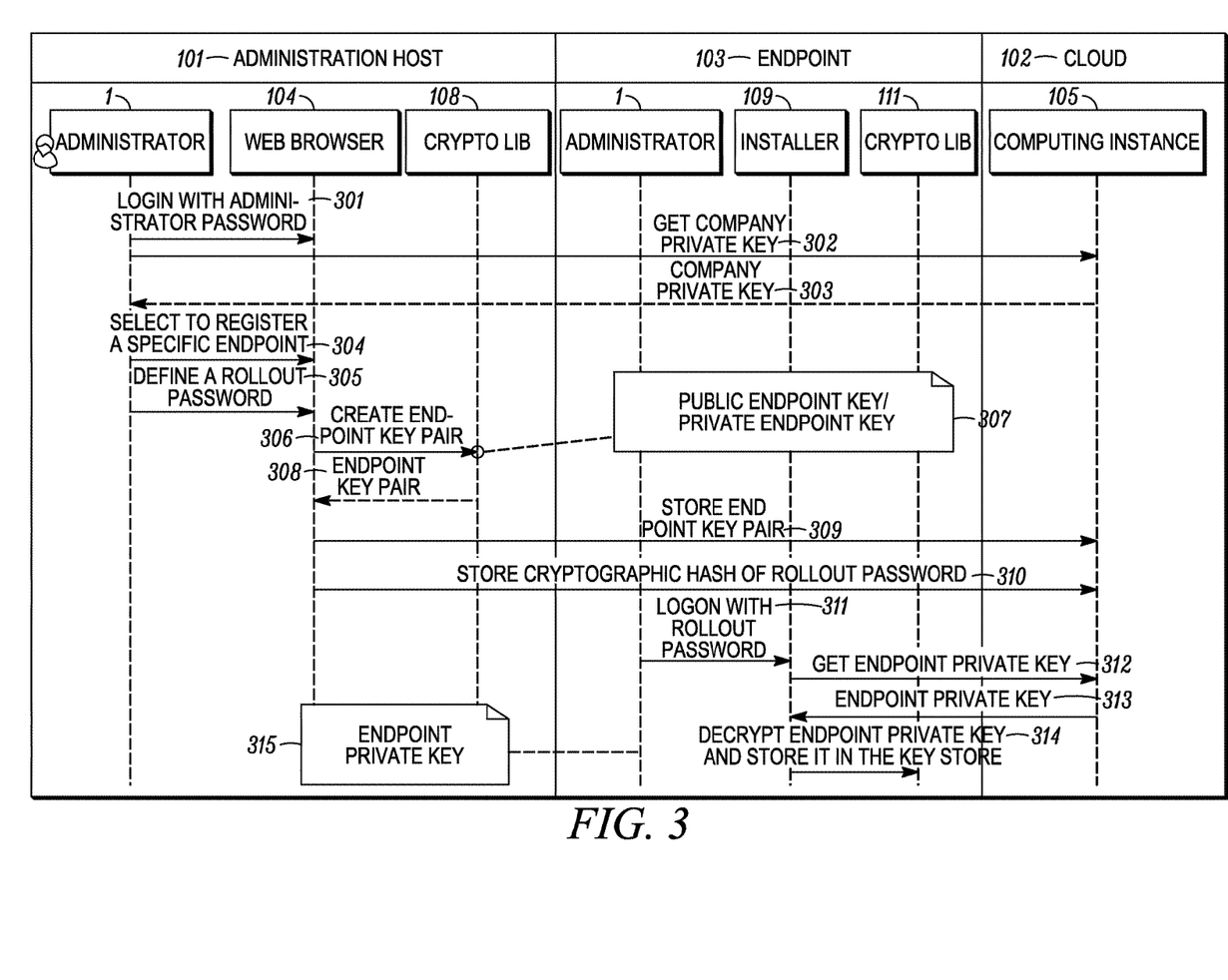
FIG. 3 is a sequence diagram showing a method for establishing trust to endpoints.

FIG. 3 is a sequence diagram showing a method for establishing trust to endpoints 103. The trust relationship provides a basis for subsequent cryptography-dependent functions and supports the establishment of a trust domain that can be used by administrators and endpoints to engage in secure and verifiable transactions. A detailed example of a method for establishing trust through a cloud-based intermediary is provided below.

As shown in step 301, an administrator 1 may log in to a host device using a previously registered username and administrator password, such as the username and password described above. As shown in step 302, the administrator 1 may then retrieve the company private key from the cloud 102 using a call to the cloud 102 that is authenticated with a cryptographic hash of the administrator password. It will be appreciated that these steps may in principle be performed locally without any use of the cloud; however storage of the company key pair in the cloud 102 affords greater flexibility to the administrator 1 who can perform subsequent cryptographically-based functions from any location using the cloud 102 and suitable credentials.

As shown in step 304, the administrator 1 may then select and endpoint 103 to register, and may define a rollout password for the selected endpoint 103 as shown in step 305. The rollout password may be a password for a single endpoint 103, a group of endpoints, a group of users or any other individual or multiple endpoints.

As shown instep 306, an endpoint key pair including an endpoint private key and an endpoint public key may be created. The endpoint public key may be signed with the company private key to facilitate verification, and the endpoint private key may be encrypted and integrity protected using the rollout password selected in step 305. The endpoint key pair may then be transmitted to the endpoint 103 as shown in step 307. The endpoint key pair may also be returned to the administrator 1 as shown in step 308. The administrator may then transmit the endpoint key pair 309 to the cloud 102 for storage using a call to the computing instance 105 or other resource on the cloud 102 that is authenticated with a cryptographic hash of the administrator password 310. This permits verification of the identity of the administrator 1 by the cloud 102 before storing the endpoint key pair. A cryptographic hash of the rollout password may also be transmitted by the administrator 1 to the cloud 102 similarly using a call that is authenticated with a cryptographic hash of the administrator password.

With the endpoint key pair securely stored on the cloud 102, the endpoint 102 can enter into a trusted relationship with the administrator 1 through the cloud 102 using the rollout password.

As shown in step 311, a user may log in to the endpoint installer 109 using the rollout password provided by the administrator 1. The rollout password may be provided to the user/endpoint using any suitable technique including providing the rollout password on a computer readable medium (such as a USB memory stick or the like), providing the rollout password in written form, or having the administrator personally perform the initial logon using the rollout password.

As shown in step 312, the installer 109 may retrieve the endpoint private key corresponding to the rollout password using, e.g., a call to the cloud 102 that is authenticated with a cryptographic hash of the rollout password.

As shown in step 313, the endpoint private key may be transmitted from the cloud 102 to the endpoint 103. As noted above, the endpoint private key may be encrypted and integrity protected with the rollout password, and may be forwarded in this form to the endpoint 103 for decryption, verification, and storage in a key store of the endpoint as shown in step 314. Once in the endpoint key store, the endpoint private key 315 may be used to sign data from the endpoint to the cloud 102, and to decrypt data coming from the cloud 102.

Figure 4:
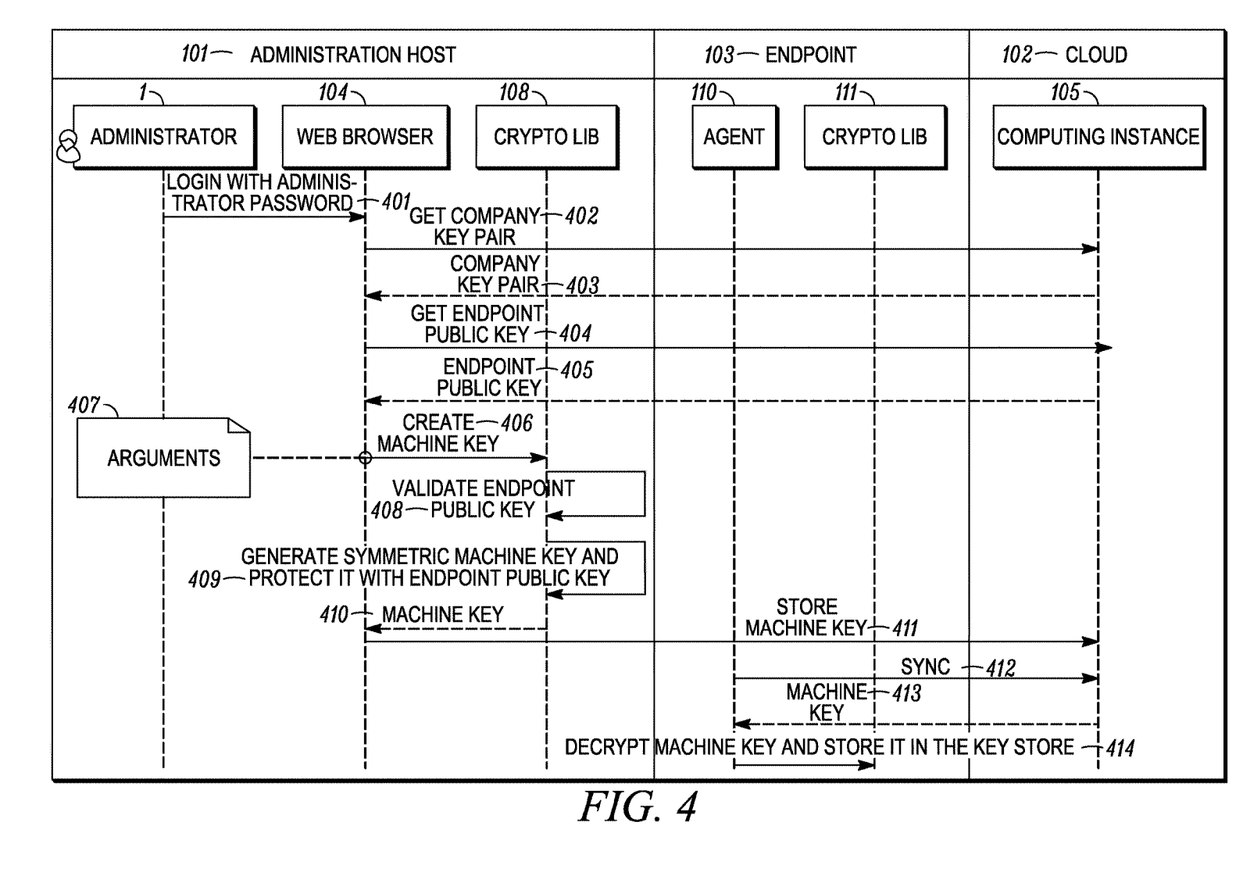
FIG. 4 is a sequence diagram showing a method for key distribution to endpoints.

FIG. 4 is a sequence diagram showing a method for key distribution to endpoints. In general, an administrator 1 may wish to centrally define symmetric keys to be used to encrypt data on the endpoints 103. These machine keys may be unique to each endpoint, and may be used to encrypt the internal drives or perform other similar functions. The symmetric key may be generated by the administrator 1 within a web browser sandbox on the host, where the symmetric key may be encrypted and integrity protected by the respective endpoint public key. The protected symmetric key may then be stored in the cloud 102. When the agent 110 on the endpoint 103 synchronizes with the cloud 102, the cloud 102 may provide the (protected) symmetric key to the endpoint, e.g., for local data encryption, or for subsequent key recovery or other operations. A detailed example of a process for distributing keys such as machine keys to endpoints is provided below.

As shown in step 401, the administrator 1 may log in to an administration host with an administrator password using a web browser 104 or similar console. The administrator 1 may then request a company key pair from the computing instance 105 in the cloud 102 as shown by step 402, using a call that is authenticated with a cryptographic hash of the administrator password. As shown in step 403 the browser may receive the company key pair, which may include a private key encrypted by the administrator password.

As shown in step 404, the web browser 104 may also request an endpoint public key from the computing instance 105 of the cloud 102, with a call similarly authenticated with a cryptographic hash of the administrator password. The endpoint public key may be signed by the company private key for verification. As shown in step 405, the endpoint public key may be returned to the web browser 104 of the administration host 101.

As shown in step 406 a machine key (e.g., a symmetry key used on a specific endpoint to encrypt data, e.g., a hard drive) for the endpoint 103 may be created using the administration host cryptography library 108. The machine key may be created using any number of arguments 407 or parameters. For example, the machine key may be created in a deterministic many using any suitable inputs or arguments. For example, the machine key may be created using arguments such as the administrator password, company key pair, endpoint public key, and the like. By selecting arguments for key generation in a predetermined manner, the machine key (or any other key contemplated herein) may be recovered independently by the administrator as needed using the selected arguments.

The administration host cryptography library 108 may then validate the endpoint public key against the company public key, which itself is checked against its private key, as shown by step 408. Additionally, the administration host cryptography library 108 may protect the symmetric machine key with the endpoint public key, as shown by step 409. The machine key may then be returned to the web browser 104 from the administration host cryptography library 108, as shown in step 410. In this step, the machine key may be encrypted and integrity protected by the endpoint public key. Step 411 illustrates the storing of the machine key in the cloud 102, where the machine key is transmitted to the cloud using a call that is authenticated with a cryptographic hash of the administrator password. The agent 110 of the endpoint 103 may then synchronize through the computing instance 105 of the cloud 102 as shown in step 412, where the call to the cloud can be authenticated with the signature of the endpoint private key. Step 413 shows the machine key (encrypted with the endpoint public key) being sent back to the agent 110 by the computing instance 105 of the cloud 102. Then, as shown by step 414, the agent 110 may decrypt the machine key using the endpoint private key and store the machine key in the key store of the endpoint 103 using the endpoint cryptography library 11.

Figure 5:
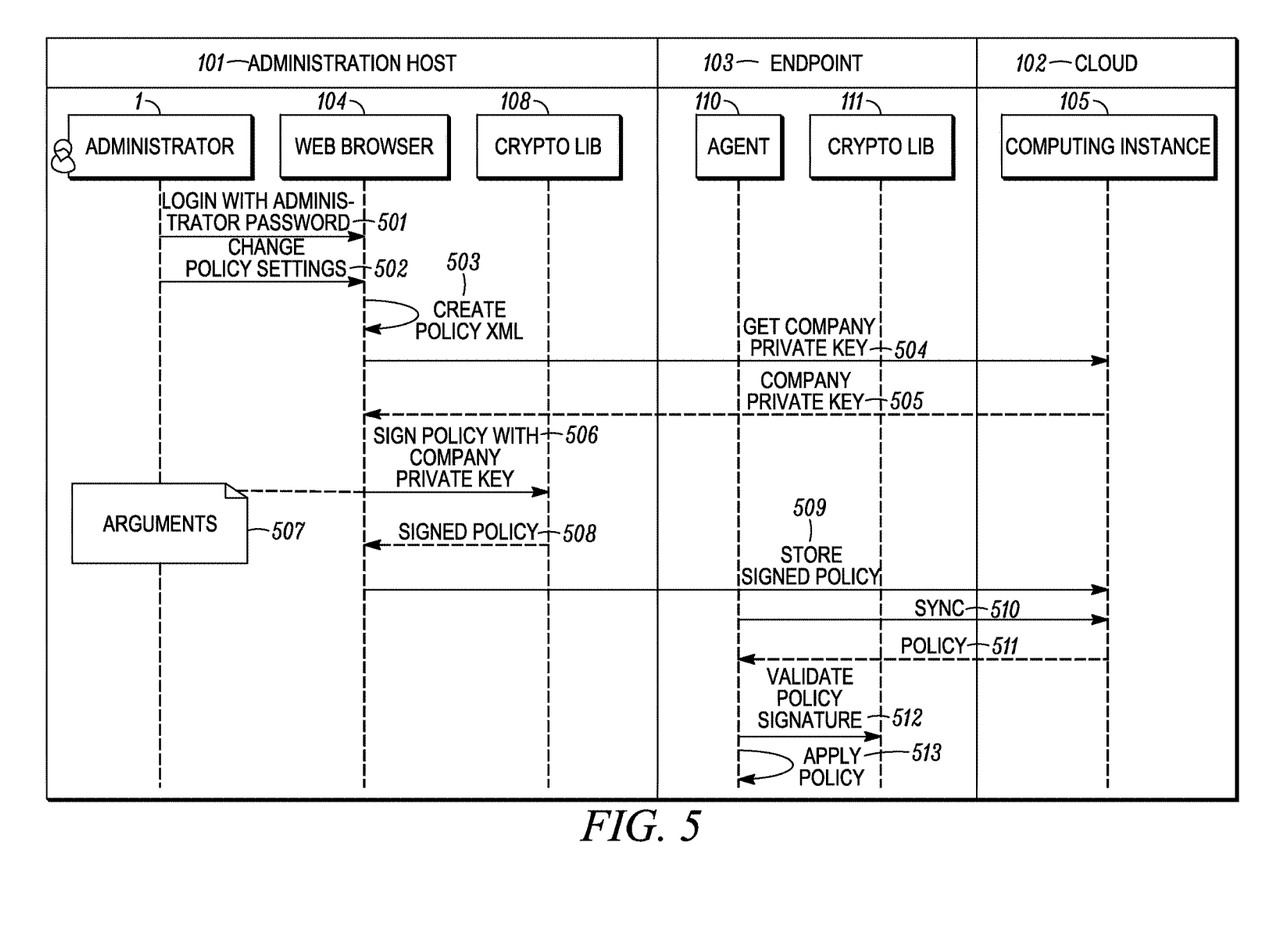
FIG. 5 is a sequence diagram showing a method for policy deployment.

FIG. 5 is a sequence diagram showing a method for policy deployment. A policy is a set of rules and the like that are defined centrally, e.g., for an enterprise or trust domain, and then applied on the endpoints 103. After a policy is created by the administrator 1 in the browser 104, the policy may be signed with the private company key 112 before it is sent to the cloud 102 to be stored. This procedure ensures that the policy is not altered on its way to the endpoint 103. Once the policy is stored, it may be retrieved by the endpoints 103. With the help of the company public key, which is available on the endpoint 103, the policy can be validated and then applied locally by the endpoint 103. A detailed example of a process for policy deployment is provided below.

A policy deployment may begin with the administrator 1 logging to an administration host in with an administrator password, as shown in step 501. The administrator 1 may then change the policy settings, as shown in step 502, and create a policy in eXtensible Markup Language (XML) or any other suitable format, as shown in step 503. Step 504 shows obtaining a company key pair from the computing instance 105 of the cloud 102, where the call may be authenticated with a cryptographic hash of the administrator password. Step 505 shows the company key pair, which may encrypted and integrity protected with the administrator password, being sent back to the web browser 104.

As shown in step 506, the process may include signing the policy with the company private key. Step 508 shows the signed policy being returned through the web browser 104. Step 509 illustrates a step of storing the signed policy in the cloud 102, where the call to the cloud may be authenticated with a cryptographic hash of the administrator password. The agent 110 on the endpoint 103 may then synchronize through the computing instance 105 of the cloud 102 as shown in step 510, where the call from the endpoint 103 to the cloud 102 may be authenticated with the signature of the endpoint private key. Step 511 shows the policy (which has been signed with the company private key) being sent back to the agent 110 by the computing instance 105 of the cloud 102. Then, the agent 110 may validate the policy signature as shown by step 512, and apply the policy, as shown in step 513.

The endpoint may synchronize to the policy on any suitable schedule. This may include a regular, periodic schedule, a manually controlled schedule, or in response to update notifications from the administrative host or other policy repository. In one aspect, the policy may itself dictate how and when the policy is synchronized.

Thus in one aspect, a method disclosed herein may include creating a security policy for the endpoint, signing the security policy with the company private key to provide a signed policy, and transmitting the signed policy from the host to the remote computing resource using a call to the remote computing resource authenticated with a cryptographic hash of the administrator password. A method may further include retrieving the signed policy from the remote computing resource to the endpoint with a call to the remote computing resource authenticated with a signature of the endpoint private key, validating the signed policy at the endpoint, and applying the security policy at the endpoint.

Figure 6:
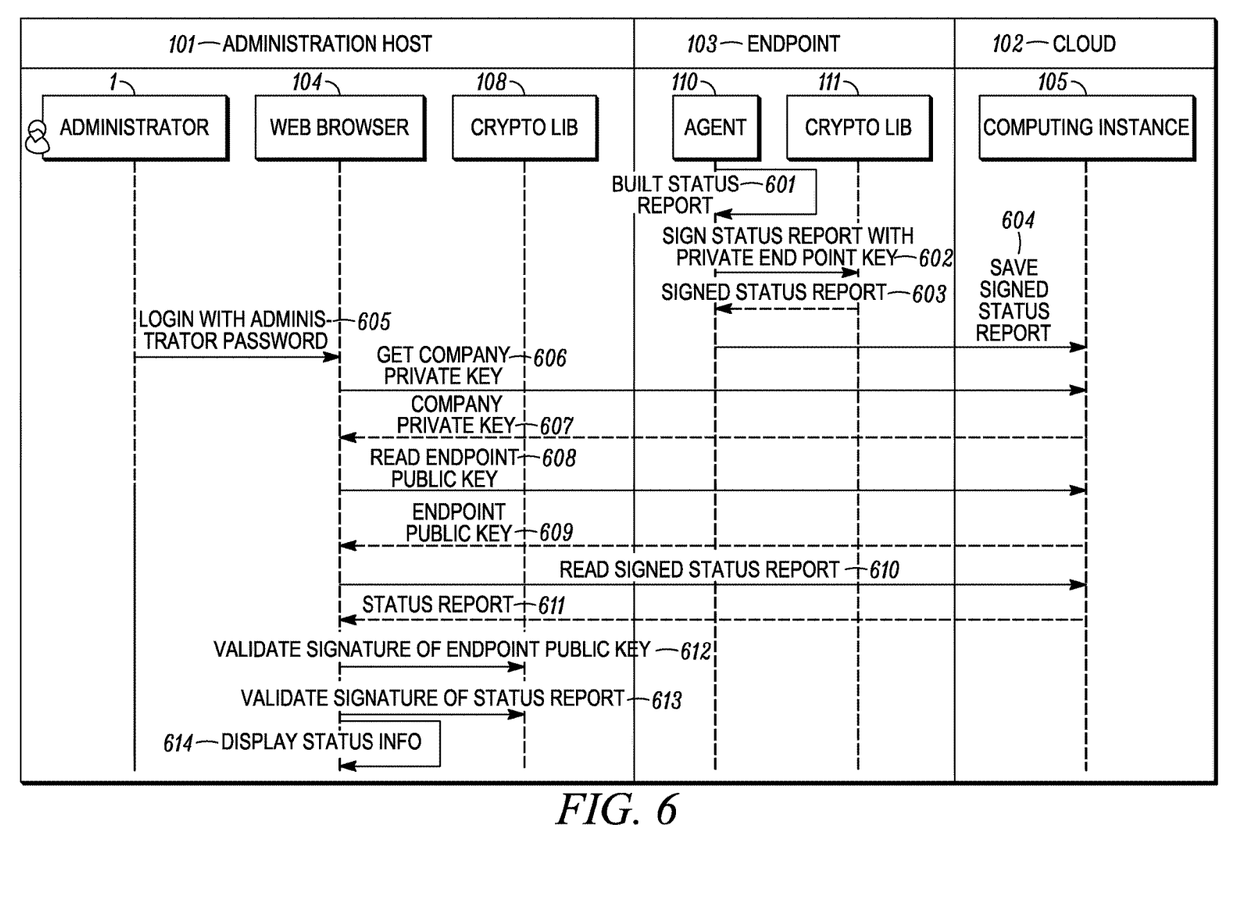
FIG. 6 is sequence diagram showing a method for generating and sending status reports from endpoints.

FIG. 6 is a sequence diagram showing a method for generating and sending status reports from endpoints. In an encryption product, a status report may, for example, tell which drives are encrypted and which users are allowed to access the machine. Status reports could also be the target of an attack. For example, an attacker could manipulate the status reports in order to hide from the administrator 1 the fact that the endpoints 103 do not adhere to the policy anymore. Therefore, the endpoint 103 may usefully encrypt or sign a status report using the techniques contemplated herein. A detailed example of a process for creating and sending status reports from endpoints is provided below.

As shown in step 601, an agent 110 executing on an endpoint 103 may build a status report (e.g., an XML document) containing any suitable status information for the endpoint 103 and processes executing thereon. The agent 110 then may sign the status report with the private endpoint key using a cryptography library 111 at the endpoint 103 as shown by step 602, and the cryptography library 111 may return a signed status report back to the agent 110 as shown by step 603. The agent 110 may then transmit the signed status report to the computing instance 105 of the cloud 102 as shown by step 604. This communication may use a call to the computing instance 105 that is authenticated with the signature of the endpoint private key.

With the status report stored in the cloud 102, an administrator 1 may then login with an administrator password using the web browser 104, as shown in step 605 and request a status report. As shown in step 606, the web browser 104 may then retrieve a company private key with a call to the computing instance 105 of the cloud 102, where the call may be authenticated with a cryptographic hash of the administrator password. Step 607 shows the company private key, which may encrypted and integrity protected with the administrator password, being sent back to the web browser 104. As shown in step 608, the browser 104 may then read an endpoint public key for the endpoint 103 with a call to the computing instance 105 in the cloud 102, and the call may be authenticated with a cryptographic hash of the administrator password. The endpoint public key, which may be signed with the company private key, may then be sent back through the web browser 104, as shown by step 609. As shown in step 610, the web browser may retrieve the signed status report with a call to the computing instance 105 in the cloud 102, and the call may be authenticated with a cryptographic hash of the administrator password. Step 612 shows validating the signature of the endpoint public key at the web browser 104 using the administration host cryptography library 108. Step 613 shows validating the signature of the status report with the web browser 104 using the administration host cryptography library 108. Status information in the status report may then be displayed, as shown by step 614, or otherwise used by the administrator 1.

Figure 7:
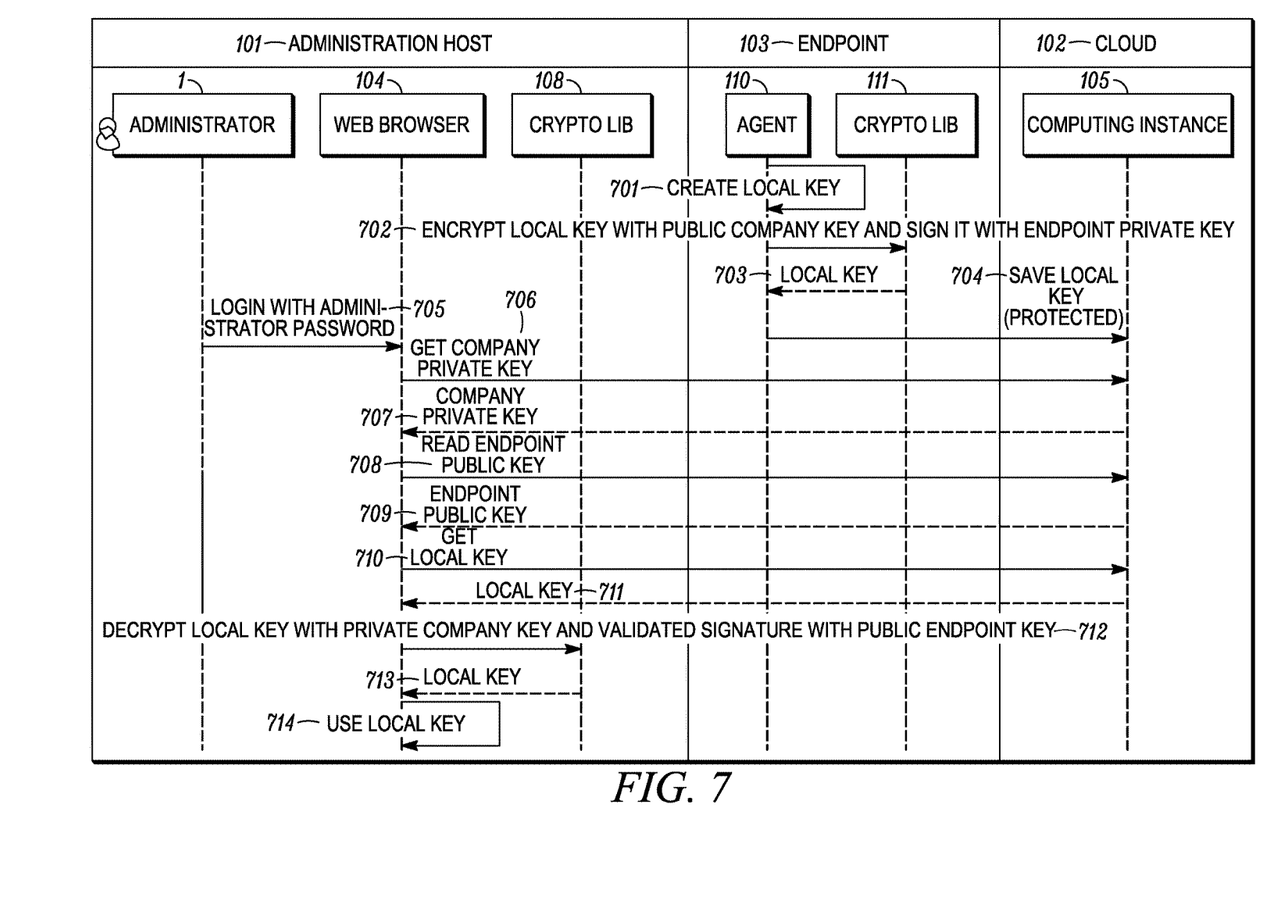
FIG. 7 is a sequence diagram showing a method for backing up keys from endpoints.

FIG. 7 is a sequence diagram of a method for backing up keys from endpoints. In various security contexts, a user may generate keys directly on an endpoint 103 for purposes such as locally encrypting data. These keys may usefully be backed up in the cloud 102 so that they can be recovered in the event that an endpoint is stolen, damaged, or otherwise compromised. Before sending such keys to the cloud 102, these local keys may be encrypted and/or integrity protected with a company public key and signed by an endpoint private key. As the administrator 1 has access to the company private key, the administrator 1 can decrypt the local keys within the web browser 104. The administrator 1 can also validate the keys with the help of the signature. A detailed example of a process for backing up local endpoint keys is provided below.

As shown in step 701, an agent 110 on an endpoint 103 may create a local key, which, for example, may be used to encrypt data stored locally on the endpoint 103. The agent 110 may then encrypt the local key with the public company key and sign it with an endpoint private key using the endpoint cryptography library 111 as shown by step 702, and the endpoint cryptography library 111 may return the local key (protected) back to the agent 110 as shown by step 703. The agent 110 may then save the local key to the cloud 102 as shown by step 704 using a call to a computing instance 105 in the cloud that is authenticated with a cryptographic hash of the administrator password.

For subsequent retrieval of the local key by the administrator 1, the administrator 1 may then login with an administrator password using a web browser 104 on the administration host 101, as shown in step 705. In step 706, the web browser 104 may request a company private key from the computing instance 105 of the cloud 102 using a call to the computing instance 105 that is authenticated with a cryptographic hash of the administrator password. As shown in step 707, the company private key, which may be encrypted and integrity protected with the administrator password, may be returned to the web browser 104. As shown in step 708, the web browser 103 may further request the endpoint public key using a call to the computing instance 105 that is authenticated using a cryptographic hash of the administrator password. The endpoint public key, which may be signed with the company private key, may then be returned to the web browser 104, as shown by step 709. As shown in step 710, the web browser 103 may further request the local key using a call to the computing instance 105 that is authenticated with a cryptographic hash of the administrator password. The local key (protected) may then be returned to the web browser 104 as shown by step 711.

As shown in step 712, the web browser 103 may then use a local cryptographic library 110 to decrypt the (endpoint) local key with the private company key and validate the signature of the local key with the public endpoint key. As shown in step 713, the local key may be returned by the host cryptographic library 108 to the web browser 104 where the local key may be used in any appropriate manner by the administrator 1 as shown in step 714. This may, for example, include transmitting the local key to the endpoint 103 or using the local key for data recovery from the endpoint 103.

It will be understood that while the foregoing examples refer generally to specific keys for specific endpoints, a variety of different keys may be used including group keys, hierarchical keys, and so forth, any of which may be usefully managed using the techniques discussed above. For example, different group keys may be assigned to different groups within an organization such as engineering, marketing, financial and so forth.

To enhance readability, the sequence diagrams/flowcharts included herein in the figures may skip steps that are not the focus of the shown system/method. For example, most of the figures include a call where to read the company private key from the cloud 102, but it is not explicitly displayed that the company private key gets decrypted and verified before it is used to sign or decrypt data.

Further, while not discussed above, it will be readily appreciated that the systems and methods described above may also or instead use a hardware security token, e.g., smart cards, USB tokens, or the like to store an administrator password, rollout password, and other credentials, passwords and the like that might be used in the key management system. In one aspect, the hardware security token may be used as a container for the passwords or keys in lieu of the administrator credentials that provide a proxy for such key-related data. The container itself may be protected by a PIN or other security feature(s) for multi-factor security protection. This allows a user to employ stronger security protection then might otherwise be available for a credential-based login system.

A number of specific methods for using the system of FIG. 1 are now discussed in greater detail.

Figure 8:
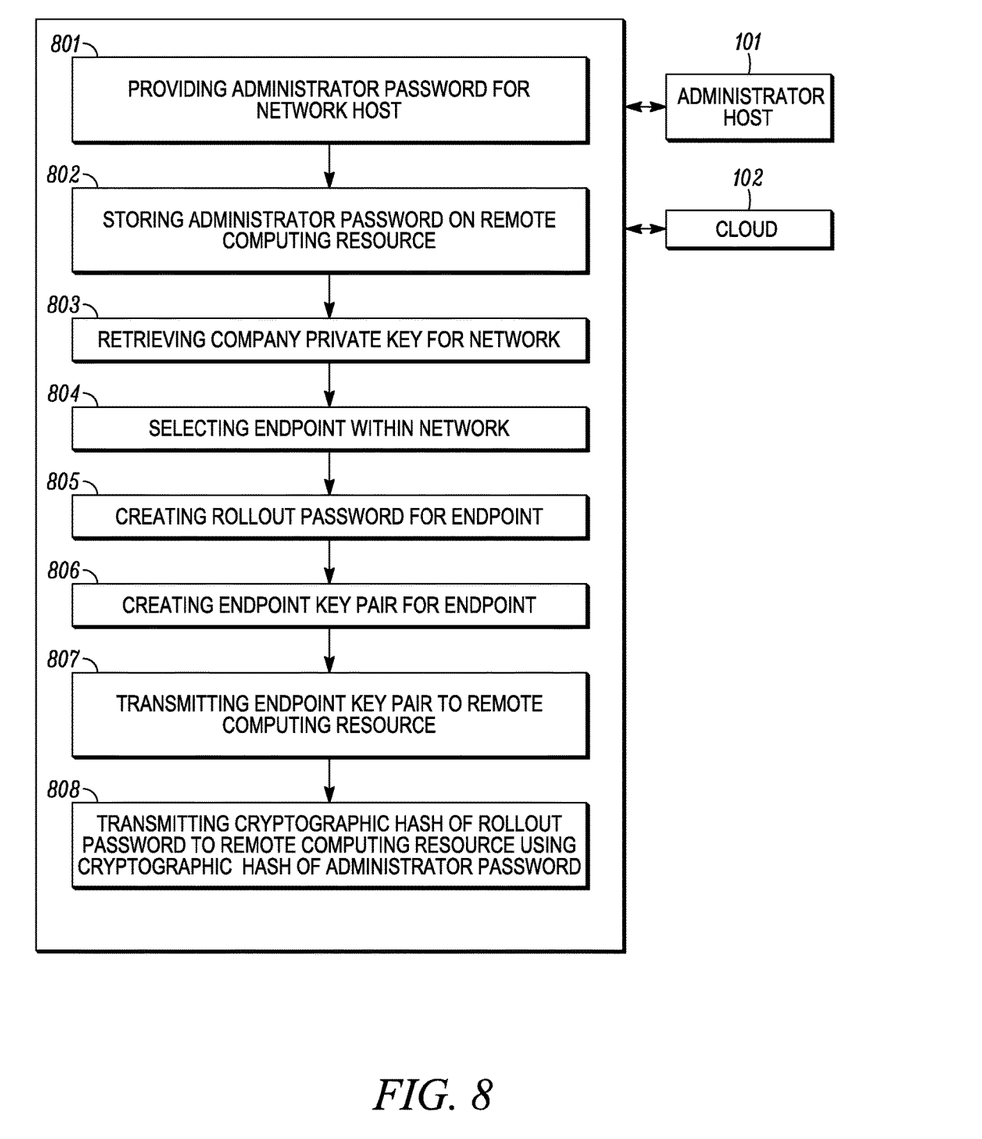
FIG. 8 is flow chart showing a method for cloud-based encryption management.

FIG. 8 is flow chart showing a method for cloud-based encryption management.

As shown in step 801, the method may begin with providing an administrator password for a network host. This may include any password, along with other credentials, select by or created for an administrator. It will be appreciated that the network host need not be a particular logical or physical machine. Instead, the network host may be any device that can operate as a host of an enterprise network or the like of an enterprise for which keys are being managed. Further, the administrator password or other credential(s) may be provided through a hardware security token. Where a hardware security token is employed, a strong administrator password may be automatically generated and stored on the hardware security token.

As shown in step 802, the method may include storing the administrator password on a remote computing resource. This may be any remote computing resource that provides, e.g., cloud services, such as the computing instance and cloud described above. The administrator password may be locally encrypted and/or signed at the host before communicating to a remote computing resource.

As shown in step 803, the method may include retrieving a company private key for the enterprise network. The company private key may be retrieved to the host using a call to the remote computing resource that is authenticated with a cryptographic hash of the administrator password.

As noted above, the company private key may belong to a company key pair previously created on the host or some other machine. Thus the method may include creating a company key pair on the host. In general, the company key pair may include a company private key and a company public key. The company private key may be encrypted using the administrator password to secure the key. The company public key may be signed, e.g., with the company private key, for subsequent verification. Finally, the company key pair may be transmitted from the host to the remote computing resource for subsequent use. The company key pair may, for example, be an asymmetric key pair such as a Rivest-Shamir-Adelman (RSA) key pair, a Diffie-Hellman key pair, or any other suitable key pair.

As shown in step 804, the method may include selecting an endpoint within the enterprise network. This may include selecting a number of endpoints, such as where the rollout password is a single group or common password to be shared among the endpoints.

As shown in step 805, the method may include creating a rollout password for the endpoint. This may include any suitable manually or computer generated password, and may be created for a single endpoint or for a group of endpoints.

As shown in step 806, the method may include creating an endpoint key pair for the endpoint. In general, the endpoint key pair may include a public endpoint key, which may be signed with the company private key, along with a private endpoint key, which may be encrypted with the rollout password. This may, for example, employ the PBKDF2 password-based key derivation function as described in RSA Laboratories' Public-Key Cryptography Standards (PKCS), and in Internet Engineering Task Force (IETF) Request for Comment (RFC) 2898.

As shown in step 807, the method may include transmitting the endpoint key pair to the remote computing resource. This communication may use a call, e.g., to a computing instance in the cloud, authenticated using a cryptographic hash of the administrator password.

As shown in step 808, the method may include transmitting a cryptographic hash of the rollout password to the remote computing resource, e.g., with a second call using a cryptographic hash of the administrator password.

As illustrated in the sequence diagrams above, the method may include numerous additional steps according to various key management functions contemplated herein.

For example, where a rollout password distribution is desired, the method may include providing the rollout password to a user of the endpoint. This may include a distribution of the rollout password through any secure means including through a direct, secure connection to the endpoint, through a written communication to a user of the endpoint, through distribution of computer readable media containing the rollout password, or by direct entry of the rollout password by an administrator.

With the rollout password, the endpoint may retrieve the endpoint key pair from the remote computing resource. As described above, this may include a request from the endpoint to the remote computing resource using a call from the endpoint to the remote computing resource that is authenticated using the cryptographic hash of the rollout password. The endpoint may then decrypt the endpoint private key from the endpoint key pair using the rollout password.

In another aspect, the method may be adapted to provide endpoint encryption keys to endpoints. For example, the method may include creating a data encryption key for the endpoint, encrypting the data encryption key with the endpoint public key to provide an encrypted data key, and transmitting the encrypted data key to the remote computing resource with a call to the remote computing resource using a cryptographic hash of the administrator password. The encryption key may for example be a machine key for local data encryption by the endpoint. In order to use the machine key, the endpoint may retrieve the encrypted machine key from the remote computing resource using, e.g., a call to the remote computing resource that is authenticated with a signature of the endpoint private key. The endpoint may then decrypt the encrypted machine key with the endpoint private key to obtain the machine key, and the endpoint may store the machine key in a local key store. The machine key may then be used in any suitable manner for local encryption and decryption of files, which may include any files, folders, disk drives or the like used to store data used locally by the endpoint.

In another aspect, the method may be adapted to manage security policies. For example, the method may include creating a security policy for an endpoint at a host. The security policy may be signed with the company private key to provide a signed policy, e.g., for validation by the endpoint, and the signed policy may be transmitted to the remote computing resource in any suitable manner, such as with a call from the host to the remote computing resource that is authenticated with a cryptographic hash of the administrator password. The method may then include retrieving the signed policy from the remote computing resource to the endpoint, e.g., with a call to the remote computing resource authenticated with a signature of the endpoint private key.

Once the endpoint has retrieved the signed policy, the endpoint may validate the signed policy and apply the security policy in any appropriate manner.

In another aspect, the method may be adapted to manage secure items on endpoints. The secure items may, for example, include a local key for an endpoint or a status report for the endpoint as generally contemplated above. The secure items may more generally be any items for which security is desired or required, such as confidential items or data (e.g., personal identification information, financial data, private communications, passwords, etc.), tamper-protected items, or any other information that is intended to be secured, e.g., according to a security policy. The process may begin with generating a secure item at the endpoint. This may include manually creating the secure item at the endpoint, or receiving the item at the endpoint and storing the item locally for subsequent use. The endpoint may sign the secure item with the endpoint private key to provide a signed item. The endpoint may then transmit the signed item from the endpoint to the remote computing resource, such as by using a call to the remote computing resource that is authenticated with a signature of the endpoint private key. The endpoint may also secure the secure item by encrypting the secure item with the company public key.

Having stored the secure item in this manner on the cloud, the secure item may be subsequently retrieved by an administrator. For example, the process may include retrieving the endpoint public key for the endpoint from the remote computing resource to the host using a call to the remote computing resource authenticated with a cryptographic hash of the administrator password. The host may then retrieve the signed item from the remote computing resource to the host using a call to the remote computing resource authenticated with the cryptographic hash of the administrator password. The host may then validate the signature of the endpoint public key as appropriate, and may validate a signature of the signed item with the (validated) endpoint public key. Where the signed, secure item has also been encrypted with the company public key, the item may be further be decrypted using the company private key at the host.

Figure 9:
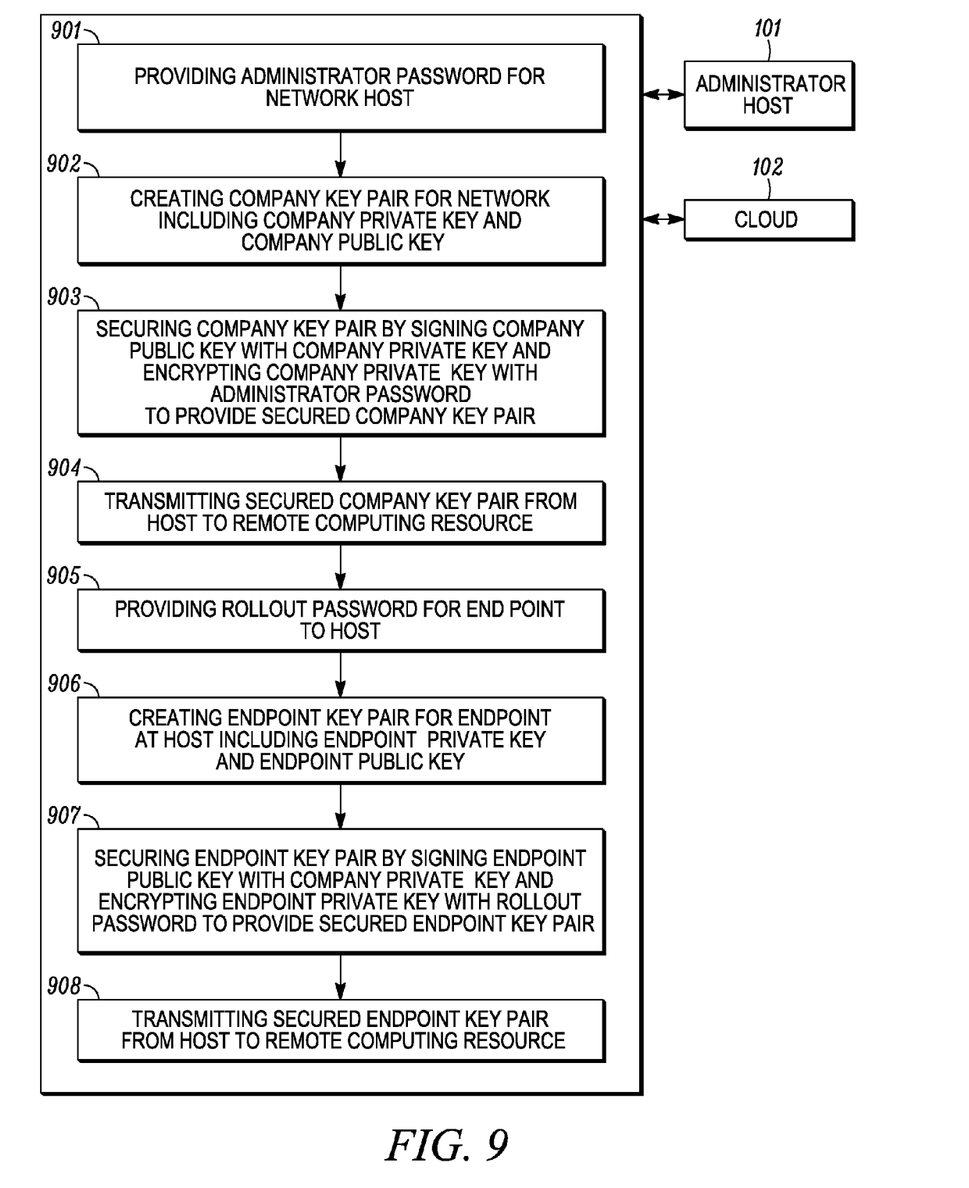
FIG. 9 is flow chart showing a method for cloud-based encryption management.

FIG. 9 is flow chart showing a method for cloud-based encryption management. In particular, FIG. 9 illustrates a method for distributing endpoint keys through the cloud, including intermediate steps of creating and storing company key pairs and a rollout password.

As shown in step 901, the method may include providing an administrator password for a host of an enterprise network.

As shown in step 902, the method may include creating a company key pair for the enterprise network including a company private key and a company public key.

As shown in step 903, the method may include securing the company key pair. This may, for example, include signing the company public key (for example, with the company private key for self-authentication) and encrypting the company private key with the administrator password to provide a secured company key pair.

As shown in step 904, the method may include transmitting the secured company key pair from the host to a remote computing resource.

As shown in step 905, the method may include providing a rollout password for an endpoint of the enterprise network to the host. The rollout password may be subsequently provided to an endpoint for use in an initial retrieval of an endpoint key pair. For example a call from the endpoint to the remote computing resource for the endpoint key pair may be authenticated with a cryptographic hash of the rollout password.

As shown in step 906, the method may include creating an endpoint key pair for the endpoint at the host including an endpoint private key and an endpoint public key.

As shown in step 907, the method may include securing the endpoint key pair by signing the endpoint public key with the company private key and encrypting the endpoint private key with the rollout password to provide a secured endpoint key pair.

As shown in step 908, the method may include transmitting the secured endpoint key pair from the host to the remote computing resource.

The endpoint key pair may then be retrieved by the endpoint and used by the endpoint as generally discussed above. For example, the endpoint may authenticate a call to the remote computing resource for a secure item with a signature of the endpoint private key, or the endpoint may secure data by encrypting the data with the endpoint public key. More generally, any of the techniques discussed above may be based upon use of the secured endpoint key pair stored on the remote computing resource, which may be retrieved and used by a host computer, an endpoint computer, or some combination of these to perform various key-related tasks.

Numerous variations are possible to the subject matter described above. In one aspect, hashes may be improved consistent with contemporary security practices by imposing more numerous or computationally expensive irreversible operations. For example, a "hash" may include calculating a large number of hashes, with the output of each hash providing an input for the next. In this manner, brute force attacks can be deterred and security improved by slowing down the process for verifying passwords and the like. Suitable existing schemes for improved hashing include, e.g., bcrypt, scrypt, and PBKDF2. Other schemes exist, and any such techniques may be suitably employed to improve hashing as generally contemplated herein. Thus it will be understood that the terms 'hash' and 'hashing' are intended to refer to any and all such techniques and similar techniques used to provide one-way deterministic verification of data.

In another aspect, while the systems and methods described above generally rely on a company key pair that is created within the enterprise. While this approach usefully provides for self-authentication where no trusted third party is available for root keys or certificates, the above techniques may also or instead be implemented using a trusted third party such as any of a number of commercially available certificate authorities (e.g., Verisign, Network Solutions, etc.). This may include verification by the cloud upon receipt of information, or by an administrator or endpoint that retrieves information from the cloud. The trusted third party may be used for verification only during the initial creation of a trust relationship (e.g., as illustrated in FIG. 2), or in various other secure transactions contemplated herein, such as any of the transactions in which the authenticity and integrity of data can usefully be verified.

Thus in one aspect, a company private key, as contemplated herein, includes a key issued by a trusted third party. In one example embodiment, an initial step fur using the methods and systems described herein may include an administrator obtaining a company private key or company key pair from the trusted third party.

The methods or processes described above, and steps thereof, may be realized in hardware, software, or any combination of these suitable for a particular application.

The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method comprising:
    providing an administrator password for a host of an enterprise network;
    retrieving a company private key for the enterprise network to an administrative host using a call authenticated with a cryptographic hash of the administrator password, wherein the company private key is received from the host as a private key encrypted with the administrative administrator password;
    selecting an endpoint within the enterprise network;
    creating a rollout password for the endpoint;
    creating an endpoint key pair for the endpoint, the endpoint key pair comprising a public endpoint key signed with the company private key and a private endpoint key encrypted with the rollout password;
    transmitting the endpoint key pair to a remote computing resource with a call authenticated using a cryptographic hash of the administrator password;
    transmitting a cryptographic hash of the rollout password to the remote computing resource with a second call using a cryptographic hash of the administrator password; and
    providing the rollout password to a user of the endpoint; and
    providing the endpoint key pair from the remote computing resource to the endpoint based on a call from the endpoint to the remote computing resource authenticated using the cryptographic hash of the rollout password.

2. The method of claim 1 wherein the administrator password is provided through a hardware security token.

3. The method of claim 2 wherein a strong administrator password is automatically generated and stored on the hardware security token.

4. The method of claim 1 further comprising selecting a plurality of endpoints,
    wherein the rollout password is shared among the plurality of endpoints.

5. The method of claim 1 further comprising creating a company key pair on the host, the company key pair including the company private key and a company public key,
    wherein the company private key is encrypted using the administrator password and wherein the company public key is signed with the company private key.

6. The method of claim 5 further comprising transmitting the company key pair from the host to the remote computing resource.

7. The method of claim 5 wherein the company key pair is a Rivest-Shamir-Adelman (RSA) key pair.

8. The method of claim 5 wherein the company key pair is a Diffie-Hellman key pair.

9. The method of claim 1 wherein the rollout password is for a plurality of endpoints.

10. The method of claim 1 further comprising retrieving the endpoint key pair from the remote computing resource to the endpoint with a call from the endpoint to the remote computing resource authenticated using the cryptographic hash of the rollout password.

11. The method of claim 10 further comprising decrypting the endpoint private key from the endpoint key pair using the rollout password.

12. The method of claim 1 further comprising retrieving the endpoint public key from the remote computing resource to the host using a call to the remote computing resource authenticated with a cryptographic hash of the administrator password.

13. The method of claim 12 further comprising creating a data encryption key for the endpoint, encrypting the data encryption key with the endpoint public key to provide an encrypted data key, and transmitting the encrypted data key to the remote computing resource with a call to the remote computing resource using a cryptographic hash of the administrator password.

14. The method of claim 13 wherein the data encryption key is a machine key for the endpoint.

15. The method of claim 14 further comprising retrieving the encrypted machine key from the remote computing resource to the endpoint using a call authenticated with a signature of the endpoint private key, decrypting the encrypted machine key with the endpoint private key to provide the machine key, and storing the machine key in a key store of the endpoint.

16. The method of claim 1 further comprising:
creating a security policy for the endpoint;
signing the security policy with the company private key to provide a signed policy; and
transmitting the signed policy from the host to the remote computing resource using a call to the remote computing resource authenticated with a cryptographic hash of the administrator password.

17. The method of claim 16 further comprising:
retrieving the signed policy from the remote computing resource to the endpoint with a call to the remote computing resource authenticated with a signature of the endpoint private key;
validating the signed policy at the endpoint; and
applying the security policy at the endpoint.

18. The method of claim 1 further comprising:
generating a secure item at the endpoint;
signing the secure item with the endpoint private key to provide a signed item; and
transmitting the signed item from the endpoint to the remote computing resource using a call to the remote computing resource authenticated with a signature of the endpoint private key.

19. The method of claim 18 wherein the secure item is a confidential item.

20. The method of claim 18 wherein the secure item is a tamper-protected item.

21. The method of claim 18 further comprising:
retrieving the endpoint public key from the remote computing resource to the host using a call to the remote computing resource authenticated with a cryptographic hash of the administrator password; and
retrieving the signed item from the remote computing resource to the host using a call to the remote computing resource authenticated with the cryptographic hash of the administrator password.

22. The method of claim 18 further comprising validating the signature of the endpoint public key and a signature of the signed item at the host.

23. The method of claim 18 further comprising encrypting the secure item at the endpoint with the company public key.

24. The method of claim 23 further comprising decrypting the secure item at the host with the company private key.

25. The method of claim 18 wherein the secure item is a local key for the endpoint.

26. The method of claim 18 wherein the secure item is a status report for the endpoint.

27. A computer program product comprising computer executable code embodied in a non-transitory computer readable medium that, when executing on one or more computing devices, performs the steps of:
providing an administrator password for a host of an enterprise network;
retrieving a company private key for the enterprise network to an administrative host using a call authenticated with a cryptographic hash of the administrator password, wherein the company private key is received from the host as a private key encrypted with the administrative administrator password;
selecting an endpoint within the enterprise network;
creating a rollout password for the endpoint;
creating an endpoint key pair for the endpoint, the endpoint key pair comprising a public endpoint key signed with the company private key and a private endpoint key encrypted with the rollout password;
transmitting the endpoint key pair to a remote computing resource with a call authenticated using a cryptographic hash of the administrator password;
transmitting a cryptographic hash of the rollout password to the remote computing resource with a second call using a cryptographic hash of the administrator password;
providing the rollout password to a user of the endpoint; and
providing the endpoint key pair from the remote computing resource to the endpoint based on a call from the endpoint to the remote computing resource authenticated using the cryptographic hash of the rollout password.

28. The computer program product of claim 27 further comprising code that performs the steps of retrieving the endpoint key pair from the remote computing resource to the endpoint with a call from the endpoint to the remote computing resource authenticated using the cryptographic hash of the rollout password, and decrypting the endpoint private key from the endpoint key pair using the rollout password.

29. A system comprising:
a network interface;
a memory; and
a processor configured by computer executable code stored in the memory to perform the steps of providing an administrator password for a host of an enterprise network, retrieving a company private key for the enterprise network to an administrative host using a call authenticated with a cryptographic hash of the administrator password, wherein the company private key is received from the host as a private key encrypted with the administrative administrator password, selecting an endpoint within the enterprise network, creating a rollout password for the endpoint, creating an endpoint key pair for the endpoint, the endpoint key pair comprising a public endpoint key signed with the company private key and a private endpoint key encrypted with the rollout password, transmitting the endpoint key pair to a remote computing resource with a call authenticated using a cryptographic hash of the administrator password, transmitting a cryptographic hash of the rollout password to the remote computing resource with a second call using a cryptographic hash of the administrator password, providing the rollout password to a user of the endpoint, and providing the endpoint key pair from the remote computing resource to the endpoint based on a call from the endpoint to the remote computing resource authenticated using the cryptographic hash of the rollout password.

30. The system of claim 29 further comprising an endpoint configured to retrieve the endpoint key pair from the remote computing resource to the endpoint with a call from the endpoint to the remote computing resource authenticated using the cryptographic hash of the rollout password, and to decrypt the endpoint private key from the endpoint key pair using the rollout password.

* * * * *